US010472263B2

(12) United States Patent
Johnson et al.

(10) Patent No.: US 10,472,263 B2
(45) Date of Patent: Nov. 12, 2019

(54) PH BALANCING SYSTEM

(71) Applicant: Pentair Water Pool and Spa, Inc., Cary, NC (US)

(72) Inventors: Bruce Johnson, Lighthouse Point, FL (US); Kevin Doyle, Delray Beach, FL (US); Keith Schulte, Parkland, FL (US)

(73) Assignee: Pentair Water Pool and Spa, Inc., Cary, NC (US)

( * ) Notice: Subject to any disclaimer, the term of this patent is extended or adjusted under 35 U.S.C. 154(b) by 306 days.

(21) Appl. No.: 15/238,490

(22) Filed: Aug. 16, 2016

(65) Prior Publication Data

US 2016/0355421 A1 Dec. 8, 2016

Related U.S. Application Data

(63) Continuation of application No. 12/320,526, filed on Jan. 28, 2009, now Pat. No. 9,416,034.

(51) Int. Cl.
*C02F 1/66* (2006.01)
*C02F 1/00* (2006.01)
(Continued)

(52) U.S. Cl.
CPC .............. *C02F 1/66* (2013.01); *C02F 1/008* (2013.01); *C02F 1/4674* (2013.01); *C02F 1/76* (2013.01);
(Continued)

(58) Field of Classification Search
CPC ...................................................... C02F 1/66
See application file for complete search history.

(56) References Cited

U.S. PATENT DOCUMENTS 3,351,542 A 11/1967 Oldershaw et al.
3,804,253 A 4/1974 Wellman et al.
(Continued)

FOREIGN PATENT DOCUMENTS

EP 0590762 A1 4/1994
FR 2761393 A1 10/1998
(Continued)

OTHER PUBLICATIONS

CAT 1000 Automated pH Controller Owner's Manual; Copyright 2005-2008 Cat Controllers, Inc.; 24 pages.
(Continued)

*Primary Examiner* — Peter Keyworth
(74) *Attorney, Agent, or Firm* — Quarles & Brady LLP

(57) ABSTRACT

Some embodiments provide a chemical balancing system for a pool that includes a salt chlorine generator system. The salt chlorine generator system produces chlorine through an electrolytic process at a salt chlorine generator cell in communication with a flow of water from the pool. A pH monitoring and balancing unit is coupled to the salt chlorine generator system. A power cord connects a power supply to the salt chlorine generator. A controller is in communication with both the salt chlorine generator system and the pH monitoring and balancing unit. The controller is configured to estimate a current pH value of the pool, determine how much pH balancing solution is required to re-balance the pool to a desired pH level, and dispense pH balancing solution until the pH level in the pool reaches the desired pH level.

20 Claims, 7 Drawing Sheets

(51) Int. Cl.
*C02F 1/467* (2006.01)
*C02F 1/76* (2006.01)
*C02F 103/42* (2006.01)

(52) U.S. Cl.
CPC ...... *C02F 2103/42* (2013.01); *C02F 2209/06* (2013.01)

(56) References Cited

U.S. PATENT DOCUMENTS

| | | |
|---|---|---|
| 3,867,290 A | 2/1975 | Mackey |
| 3,902,202 A | 9/1975 | Strange, Jr. |
| 3,924,808 A | 12/1975 | Cooley |
| 4,002,293 A | 1/1977 | Simmons |
| 4,085,028 A | 4/1978 | McCallum |
| 4,100,052 A | 7/1978 | Stillman |
| 4,136,005 A | 1/1979 | Persson et al. |
| 4,224,154 A | 9/1980 | Steininger |
| 4,244,802 A | 1/1981 | Pohto et al. |
| 4,255,246 A | 3/1981 | Davis et al. |
| 4,265,402 A | 5/1981 | Tsai |
| 4,336,225 A | 6/1982 | Hanford et al. |
| 4,439,295 A | 3/1984 | Richards |
| 4,472,256 A | 9/1984 | Hilbig |
| 4,500,404 A | 2/1985 | Tucker |
| 4,508,687 A | 4/1985 | Houghton |
| 4,519,889 A | 5/1985 | Pellegri et al. |
| 4,599,159 A | 7/1986 | Hilbig |
| 4,657,670 A | 4/1987 | Newton |
| 4,714,534 A | 12/1987 | Fair et al. |
| 4,767,511 A | 8/1988 | Aragon |
| 4,808,290 A | 2/1989 | Hilbig |
| 4,861,451 A | 8/1989 | David |
| 4,889,283 A | 12/1989 | Fuller et al. |
| 4,923,618 A | 5/1990 | Casberg et al. |
| 4,955,540 A | 9/1990 | Fuller et al. |
| 4,992,156 A | 2/1991 | Silveri |
| 5,019,250 A | 5/1991 | Lorenzen |
| 5,027,853 A | 7/1991 | Walko et al. |
| 5,037,519 A | 8/1991 | Wiscombe |
| 5,045,187 A | 9/1991 | Suchanek |
| 5,053,114 A | 10/1991 | Maddock |
| 5,124,032 A | 6/1992 | Newhard |
| 5,218,983 A | 6/1993 | King |
| 5,221,444 A | 6/1993 | Silveri |
| 5,223,822 A | 6/1993 | Stommes et al. |
| 5,239,285 A | 8/1993 | Rak |
| 5,251,656 A | 10/1993 | Sexton, Sr. |
| 5,277,802 A | 1/1994 | Goodwin |
| 5,320,748 A | 6/1994 | Dupuis |
| 5,362,368 A | 11/1994 | Lynn et al. |
| 5,427,140 A | 6/1995 | Bosanquet |
| 5,427,658 A | 6/1995 | Allen |
| 5,439,170 A | 8/1995 | Dach |
| 5,468,360 A | 11/1995 | David et al. |
| 5,541,363 A | 7/1996 | Weise et al. |
| 5,567,283 A | 10/1996 | Lynn et al. |
| 5,647,396 A | 7/1997 | Stommes et al. |
| 5,656,771 A | 8/1997 | Beswick et al. |
| 5,687,575 A | 11/1997 | Keville |
| 5,732,619 A | 3/1998 | Hata et al. |
| 5,802,750 A | 9/1998 | Fulmer |
| 5,807,473 A | 9/1998 | Sadler et al. |
| 5,979,791 A | 11/1999 | Kuykendal et al. |
| 5,985,155 A | 11/1999 | Maitland |
| 5,993,669 A | 11/1999 | Fulmer |
| 5,993,753 A | 11/1999 | Davidson |
| 6,076,741 A | 6/2000 | Dandrel et al. |
| 6,096,202 A | 8/2000 | Fulmer |
| 6,125,481 A | 10/2000 | Sicilano |
| 6,238,555 B1 | 5/2001 | Silveri et al. |
| 6,276,612 B1 | 8/2001 | Hall |
| 6,277,288 B1 | 8/2001 | Gargas |
| 6,309,538 B1 | 10/2001 | Khan |
| 6,391,167 B1 | 5/2002 | Grannersberger |
| 6,427,927 B1 | 8/2002 | Hall |
| 6,517,713 B2 | 2/2003 | Gargas |
| 6,551,518 B2 | 4/2003 | Gargas |
| 6,611,114 B1 | 8/2003 | Yen |
| 6,625,824 B1 | 9/2003 | Lutz et al. |
| 6,656,353 B2 | 12/2003 | Kilawee et al. |
| 6,717,383 B1 | 4/2004 | Brunt et al. |
| 6,820,647 B1 | 11/2004 | Grecco et al. |
| 6,938,586 B2 | 9/2005 | Manners et al. |
| 7,061,080 B2 | 6/2006 | Jeun et al. |
| 7,114,637 B2 | 10/2006 | Davis |
| 7,167,087 B2 | 1/2007 | Corrington et al. |
| 7,238,278 B2 | 7/2007 | Coffey et al. |
| 7,291,261 B1 | 11/2007 | Rhodes |
| 2001/0045380 A1 | 11/2001 | Khan |
| 2002/0035403 A1 | 3/2002 | Clark et al. |
| 2003/0024809 A1 | 2/2003 | Broembsen |
| 2005/0016592 A1 | 1/2005 | Jeromson et al. |
| 2005/0137118 A1 | 6/2005 | Silveri |
| 2005/0194296 A1 | 9/2005 | Lin |
| 2006/0027463 A1 | 2/2006 | Lavellet et al. |
| 2006/0054219 A1 | 3/2006 | Sund et al. |
| 2006/0169647 A1* | 8/2006 | Doyle ................. C02F 1/46104 210/739 |
| 2006/0243328 A1 | 11/2006 | Bessmertny |
| 2006/0283811 A1 | 12/2006 | Unhoch |
| 2007/0012631 A1 | 1/2007 | Coffey et al. |
| 2007/0207053 A1 | 9/2007 | Doyle et al. |
| 2008/0290039 A1 | 11/2008 | King et al. |
| 2009/0100275 A1 | 4/2009 | Chang et al. |
| 2009/0101593 A1* | 4/2009 | Dresty ................... C02F 1/487 210/695 |
| 2010/0187185 A1 | 7/2010 | Johnson et al. |

FOREIGN PATENT DOCUMENTS

| | | |
|---|---|---|
| FR | 2785898 A1 | 5/2000 |
| JP | H08189217 A | 7/1996 |
| WO | 9628390 A1 | 9/1996 |
| WO | 9840585 A1 | 9/1998 |

OTHER PUBLICATIONS

Lossless power monitoring increase efficiency by Richard Kroeger; Electronic Products POWER Supplement 2008; 2 pages.
Chloromatice®; Owners Manual Model CNR and Eco-Chlor/CNSC Series; Monarch Pool Systems; 10 pages.
Solartrope Supply Corporation, Aqua Rite—Chlorinator; retrieved from Internet Archive Wayback Machine; 6 pages.

* cited by examiner

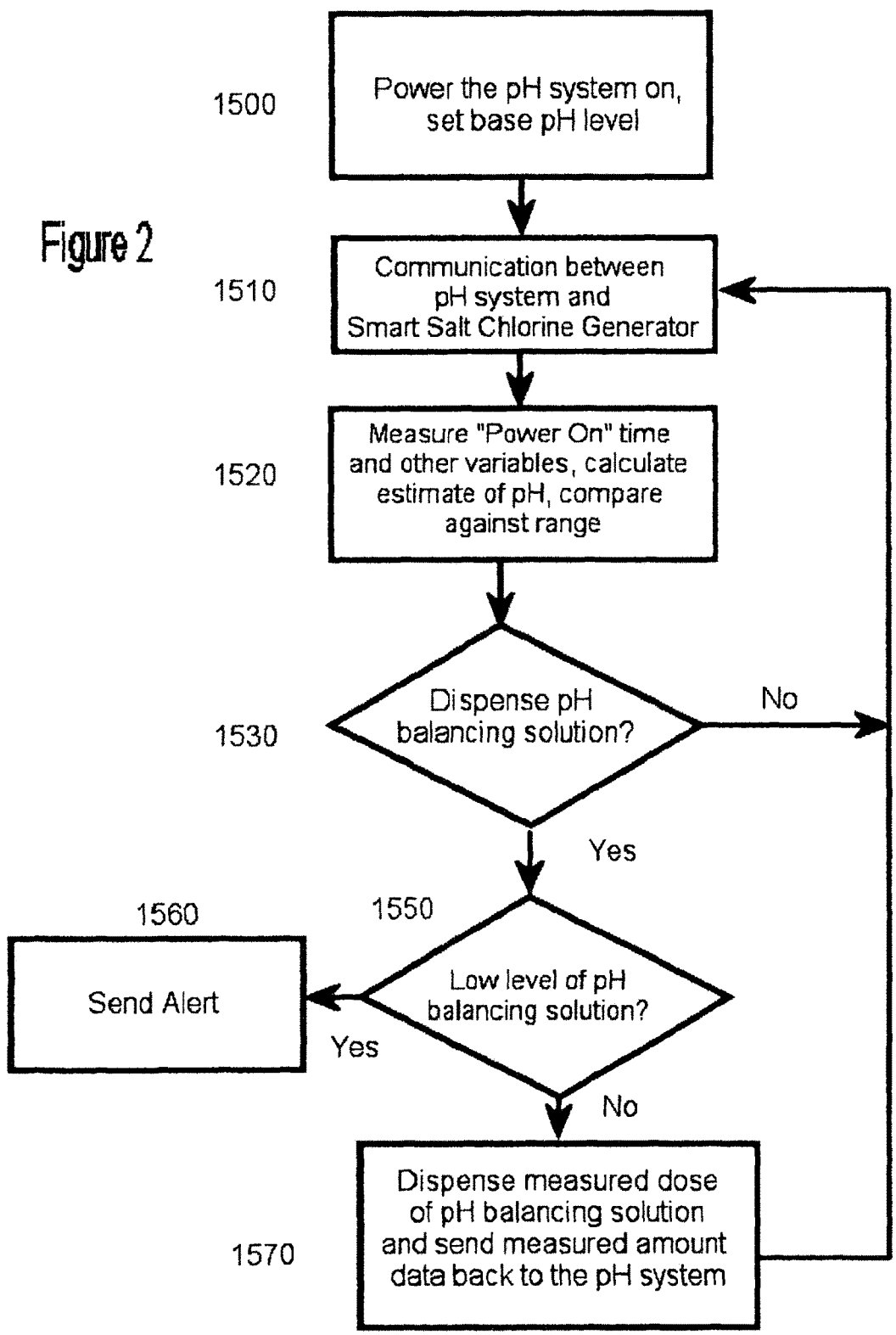

PH BALANCING SYSTEM

CROSS REFERENCE TO RELATED APPLICATIONS

This application is a continuation of U.S. patent application Ser. No. 12/320,526 filed Jan. 28, 2009, which is incorporated by reference in its entirety.

BACKGROUND OF THE INVENTION

1. Field of the Invention

The invention relates to a system for controlling the pH balance of a body of water or pool within a given range, for example the chlorine and pH balance of a swimming pool, through monitoring the operational time of a salt chlorine generator in the chlorination system and calculating an estimated pH based in whole or in part on this variable.

2. Background of the Invention

Recreational pools such as swimming pools, spas and hot tubs provide a great deal of pleasure and comfort. Similarly, landscaping often incorporates bodies of water for a pleasing aesthetic. The extent of aesthetic beauty or comfort depends on the quality of the water In order to assure comfort and safety to users of these pools, it is important that the water be treated properly so that it is aesthetically pleasing in terms of taste, color, turbidity and odor. Proper treatment also is important so that the water has proper pH, and is environmentally safe as well as effectively free of pathogens and chemicals which may cause illness.

Many systems have been designed for controlling the chemical balance of swimming pools and the like. Several systems have sought patent protection, including the following:

| Pat. No. | Inventor(s) |
| --- | --- |
| 3,804,253 | Wellman et al. |
| 4,224,154 | Steininger |
| 4,381,240 | Russell |
| 4,657,670 | Newton |
| 5,019,250 | Lorenzen |
| 5,277,802 | Goodwin |
| 5,320,748 | Dupuis |
| 6,125,481 | Sicilano |
| 6,309,538 | Khan |
| 7,167,087 | Corrington et al. |
| 7,291,261 | Rhodes |
| 2001/0045380 | Khan |
| 2005/0137118 | Silveri |
| 2005/0194296 | Lin |
| 2006/0283811 | Unhoch |
| 2007/0012631 | Coffey et al. |
| FR 27-85898 | Giroguy |
| JP 81-89217 | Yamagata |

For the most part, simple, inexpensive systems performing this function automatically dispense pre-set amounts of chemicals into the pool at pre-set intervals or through other processes such as salt-chlorine generation. Maintaining the chemical balance of a swimming pool is quite important. If the chemical balance departs from a given range, unsanitary conditions will develop permitting algae and bacteria to grow and contaminate the pool. If such conditions exist for long, they may require the pool to be drained and acid washed. Improperly high chlorine or other chemicals and resulting pH levels can cause eye and skin irritations to swimmers, as well as pipe corrosion or scaling to the recirculation system, giving rise to increased operating and heating costs due largely to the resultant inefficiencies.

To operate properly these systems generally require consistent monitoring on the part of the pool owner to maintain proper operation and proper chemical balance within the pool. Even when properly monitored, in the case of salt chlorine generators, the sanitation process can dramatically change the pH level within the body of water or pool being sanitized. Similarly, conditions such as pool usage, weather, temperature, and other environmental factors can also change the pH balance in the body of water.

The more expensive, elaborate versions of such pool treatment systems can sense the chemical balance of the pool, and dispense chemicals to maintain the pH balance of a pool with a given range. Most use probes or sensors that detect the pH levels and then dispense acid accordingly. They are generally quite expensive and are plagued with field calibration issues and probe and sensor failure. Moreover, because of their elaborate nature such systems only are economical for large, heavily used pools. Even when used in such pools, they require additional and significant maintenance of the sensors in the pool and the system communicating the readings from these sensors to such systems.

There is a need for an automatic chemical control system for a swimming pool, one which is relatively simple in construction and durable in operation. Such a system would provide significant safety and a real convenience to the pool owner, reducing maintenance costs and permitting extended periods of operation with little or no need for adjustment or attention. The system described herein meets these objectives, as well as other objectives which will be apparent to those skilled in the art upon reading the following detailed description.

SUMMARY OF THE INVENTION

An object of the invention is to provide a pH balancing system accurately dispensing pH balancing solution into a swimming pool based on the chlorine production run time of a chlorine generator.

Another object of the invention is to provide a pH balancing system that operates on detection of power output to a cell and then computes acid demand from chlorine production for the chlorine generator for that period of time.

A still further object of the invention is to provide a pH balancing system which adds acid at predetermined intervals based on either "pump on time" or each time the pump is turned on, making a calculation of generated chlorine based on a sensed run time for a chlorine generator.

The invention includes an apparatus and a method of operating the apparatus. The method for dispensing a pH balancing solution into a smart chlorine generator system includes the steps of powering on a pH balancing unit; setting a dispensed amount of pH balancing solution to zero or a starting value; communicating data between the pH balancing unit and the smart chlorine generator, exchanging operational data, including any historical data stored on the smart salt chlorine generator operating time and any relevant performance parameters in its generation of chlorine; monitoring and measuring operating time of the smart chlorine generator; calculating an estimated pH based on received operating time and smart salt chlorine generator time variable in view of relevant performance and/or operating parameters; determining if the estimated pH is within a desired range and if the estimated pH is within the desired range then returning to monitoring and measuring the operating time of the smart chlorine generator, if it is not within the desired range dispensing a measured dose of pH balancing solution at a predetermined rate; storing the amount of solution dispensed and reporting this amount to the pH balancing solution unit; and returning to monitoring and measuring operating time of the smart chlorine generator.

The method can further include the method step of calculating the amount of pH balancing solution remaining and notifying a user through an alert if a low pH balancing solution is calculated.

The apparatus of the invention in an exemplary embodiment includes a pH balancing solution dispensing system having a salt chlorine generator system serving a body of water, the salt chlorine generator system having an on or operational state and a off or non-operational state, wherein when in the operational state the salt chlorine generator system produces chlorine through an electrolytic process at a salt chlorine generator cell in communication with a flow of water from the body of water. A pH monitoring and balancing unit coupled to the salt chlorine generator system and having a pH monitoring and balancing unit controller measuring the time the salt chlorine generator system is in the operational state and calculating an estimated pH adjustment requirement for the body of water being served by the salt chlorine generator system based in at least part on the measured time the salt chlorine generator is in an operational state. A pH balancing solution dispenser that is in communication with the controller, the pH balancing solution dispenser dispensing a specifically metered dose of pH solution when instructed by the pH monitoring and balancing unit controller to balance the pH of the body of water based on the estimation made by the pH monitoring and balancing unit controller using the measured operational time and reporting the dispensed amount back to the pH measuring and balancing controller to update the estimate of the pH of the body of water.

The exemplary embodiment can further include a salt chlorine generator system controller monitoring the functions of the salt chlorine generator cell and its functions in producing chlorine through an electrolytic process. A smart power supply coupled to the salt chlorine generator system and the pH monitoring and balancing unit can also be included, the smart power supply monitoring the power drawn by the salt chlorine generator system and thereby measuring the time the salt chlorine generator system is in the operational state and reporting this to the pH monitoring and balancing unit controller.

An at least one dispensing mechanism can be included with the exemplary embodiment, the dispensing mechanism dispensing the pH balancing solution into the body of water. The dispensing mechanism can be located in the salt chlorine generator system. The dispensing mechanism can be located externally from the salt chlorine generator system. The dispensing mechanism can also have an at least one of a dispensing pump, a peristaltic pump, a venturi feed system, a diaphragm pump, and a gravity feed tube.

The salt chlorine generator system and the pH monitoring and balancing unit can be coupled via a communications link in an exemplary embodiment. The salt chlorine generator system and the pH monitoring and balancing unit can be coupled via a communications link to a master controller. The exemplary embodiment of the invention can further include an adjustment device to adjust the rate at which the pH balancing solution is dispensed depending on the specific variables of the pool or body of water. A programmable interface screen can be provided. Software on the pH balancing and monitoring unit controller can be programmed through the programmable interface screen to adjust the dispensing rate for at least one of the type of smart salt chlorine generator, the volume of the body of water, and the amount of use the body of water receives.

In another exemplary embodiment of the invention, a pH balancing solution dispensing system can be provided having a chlorine generator, a power supply coupled to the chlorine generator, the chlorine generator servicing a body of water and chlorinating it. A pH monitoring and balancing unit is provided, wherein the pH monitoring and balancing unit monitors and measures when power is supplied from the power supply to the chlorine generator to produce chlorine and thereby calculates an operational time for the chlorine generator. A pH monitoring and balancing unit controller, the pH monitoring and balancing unit controller computing an estimated pH level based on the production of the chlorine generator from the operational time measured through monitoring the power supplied to the chlorine generator, then determining if the estimated pH is outside of a desired range, and, if it is outside of the desired range, metering a discrete amount of pH balancing solution based on this estimated pH level to return the pH of the body of water to within the desired range.

A programmable power supply controller can be provided that measures and reports the power consumption of the chlorine generator to pH monitoring and balancing unit. A power monitoring element that detects a flow of energy into the chlorine generator and reports it to the pH monitoring and balancing unit can also be provided. The power monitoring element can be for example an inductor coil coupled to a power cord that connects the power supply to chlorine generator.

In yet a further exemplary embodiment of the invention, a pH balancing solution dispensing system is provided having a return line circulating water from a body of water with an actuated three-way valve connecting the return line and an at least one piping loop for chlorination of incoming water and a chlorine generator within the at least one piping loop. A power supply is coupled to the chlorine generator, the chlorine generator servicing the body of water and chlorinating the water circulated into the at least one piping loop and returning the water via the return line to the body of water. A pH monitoring and balancing unit is provided wherein the pH monitoring and balancing unit monitors and measures when power is supplied from the power supply to the chlorine generator to produce chlorine and thereby calculates an operational time for the chlorine generator. A pH monitoring and balancing unit controller is included, the pH monitoring and balancing unit controller computing an estimated pH level based on the production of the chlorine generator from the operational time measured through monitoring of the power supplied to the chlorine generator, then determining if the estimated pH is outside of a desired range, and, if it is outside of the desired range, metering a discrete amount of pH balancing solution based on this estimated pH level to return the pH of the body of water to within the desired range, the discrete amount of pH balancing solution being added to the water in the at least one piping loop and a chlorine flow switch is included, such that after metering the discrete amount of pH balancing solution the three-way valve can be moved to a position so as to activate the chlorine flow switch and allow for unrestricted flow in both the at least one piping loop for chlorination of incoming water and the return line circulating the water back to the body of water.

The three-way valve can close the at least one piping loop from the return line prior to activating the chlorine flow switch and the discrete amount of pH balancing solution is added to the water remaining in the loops, such that the pH balancing solution cleans the chlorinator for a period of time and then the three-way valve is opened to allow for unrestricted flow in both the at least one piping loop for chlorination of incoming water and the return line circulating the water back to the body of water.

Moreover, the above objects and advantages of the invention are illustrative, and not exhaustive, of those which can be achieved by the invention. Thus, these and other objects and advantages of the invention will be apparent from the description herein, both as embodied herein and as modified in view of any variations which will be apparent to those skilled in the art.

BRIEF DESCRIPTION OF THE DRAWINGS

Embodiments of the invention are explained in greater detail by way of the drawings, where the same reference numerals refer to the same features.

FIG. 2 provides a flow chart showing an exemplary method of operating an embodiment of the instant invention.

DETAILED DESCRIPTION OF THE INVENTION

The instant invention provides a system that does not use probes or sensors but uses the measurement of the chlorine generator cell (CGC) hours of operation or "run time" to compute how much pH balancing solution to dispense into the pool. This is a unique, consistent, inexpensive, but reliable method to solve the issue of automating pH compensation.

To make chlorine from salt water with an electrolytic or salt-chlorine generator cell (SCGC) such as that shown in co-pending U.S. patent application Ser. No. 11/258,136 marketed as the INTELLICHLOR system, an electrolysis plate causes chlorine to separate from a salt molecule. The chemical reaction that occurs inside the cell is slightly basic which makes the pool or bodies of water tend to have a pH in, for example, the range of 7.8 to 8.2. The recommended level for pH in a pool is, for example, generally 7.2 to 7.6. If the pool pH rises above the top end of the range, the sanitizing effectiveness of the chlorine produced by the salt-chlorine generator can be greatly reduced. For example, if the pH level in a body of water or pool is 7.2 the chlorine from the chlorination of the SCG is approximately ten times more effective than the same amount of chlorine in a pool with a pH of 8.2.

Likewise, the pool water at the higher pH levels can create irritated eyes and strong chemical smells. Adding acid on a regular basis keeps the pool in balance. This creates the best water chemistry and increases the life of the chlorine cell due to the increased efficiency of the chlorine produced thus allowing the cell to run at lower settings extending cell life. It is therefore desirable to automate the pH balancing of the water chemistry for a swimming pool by providing a simple, easily maintained, automated pH dispensing system.

Figure 1:
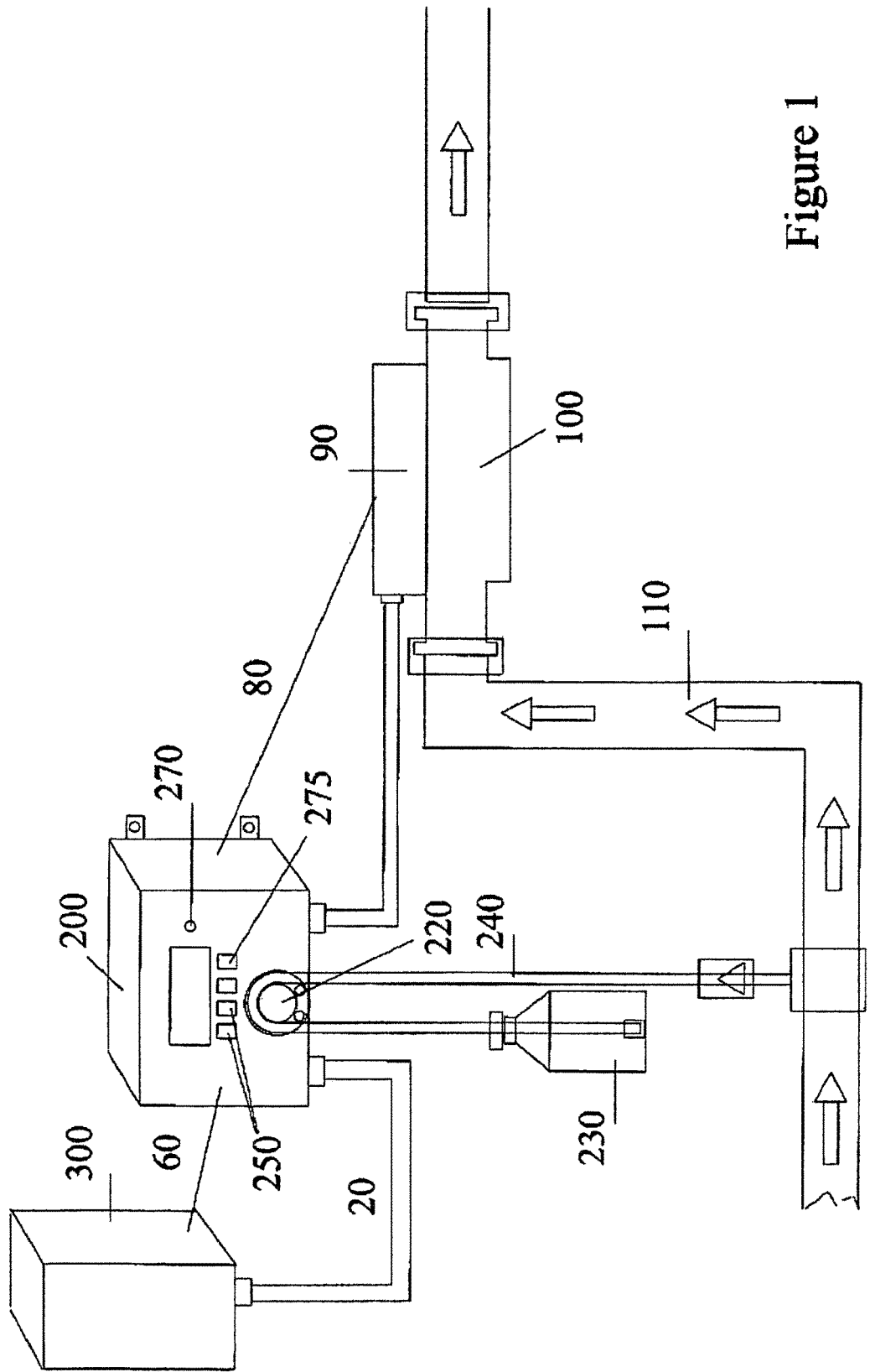
FIG. 1 shows a plan view of an exemplary embodiment of the invention.

FIG. 1 shows a plan view of an exemplary embodiment of the invention. The most recent advances in salt chlorine generation systems have produced feature rich systems with multiple internal sensors. At the heart of such systems is a smart salt chlorine salt generator cell (SmSCGC) 100 can typically include a PC board, a display, and a user interface with, for example, buttons and indicator lights (not shown). A smart salt chlorine generator cell controller 90 is provided and can communicate with the pH monitoring and balancing unit or pH monitoring and dispensing unit 200. This can be done wirelessly or through a wired connection 60, 80, such as an RS-485 line. The smart salt chlorine generator cell controller 90 monitors the functions of the smart salt chlorine generator cell 100 and its functions in producing chlorine through an electrolytic process.

For the SmSCGC system shown, the pH monitoring and balancing unit 200 is plugged in via an existing quick disconnect power plug 20 into the SmSCGC power center 300 where the SmSCGC 100 is normally installed and powered. The SmSCGC 100 is plugged in via a similar quick disconnect plug 30 on the pH monitoring and balancing unit 200 or via a similar quick disconnect plug into the SmSCGC power center 300. The pH monitoring and balancing unit 200 then becomes part of the overall SmSCGC system. A dispensing mechanism 220 is located in or externally from the pH monitoring and balancing unit 200, shown in this example as, but is certainly not limited to, a dispensing pump. The dispensing mechanism 220 can be for instance a peristaltic pump, but in can also include any other type of dispensing mechanisms, such as venturi feed systems, diaphragm pumps, gravity feed tubes, and the like that provide the necessary dispensing of the pH balancing solution 230, shown in a container, in a metered manner.

The power for the electronics of the monitoring and balancing unit 200 and the dispensing device 220 comes from the same power that typically powers the SmSCGC 100 in the exemplary embodiment shown. Alternatively, they may be operated from different power sources or connected via different methods, but the measurement or monitoring of power or "on time" of the SmSCGC 100 must be measurable by the pH monitoring and dispensing unit controller 210 or otherwise communicated to the pH monitoring and balancing unit 200.

The in line installation of the SmSCGC 100 also allows the pH monitoring and balancing unit 200 to access and communicate with the power center and the SmSCGC 100 and it's controller 90 with a communication link 60,80 that go to the cell and out to other equipment such as an in house control system or display or other devices. This can also be accomplished wirelessly through transceivers in the units and following suitable communications network protocols, e.g. Bluetooth, RF, and the like. This allows the pH monitoring and balancing unit 200 to "talk" or communicate to the cell 100 and query it for various pieces of information and similarly communicate this information out to other devices. This information can include, but is not limited to, what model of SmSCGC 100 it is, the elapsed time since its last communication, whether the SmSCGC has produced or is producing chlorine, status of the salt level, status of the pH balancing liquid, and the like.

By obtaining the hours of use or time of operation or operational time or "run time" from the smart salt chlorine generator cell 100 or the measurement of the power consumption by the cell and correlating that to the time of operation or similar techniques for measuring hours of operation, the controller 210 can then compute an estimate for the current pH of the body of water being serviced by the smart chlorinator system. Based on this, further calculations by the controller 210 determine how much pH balancing solution is required to re-balance the pool to a desired pH range. This can be done, for example, through the use of lookup tables or through a mathematical representation of the change in pH created by the electrolysis process per minute and then calculating this change for the time of operation or "on time" of the chlorinator. Since the dispensing devices 220 are precise in their dispense rate, the proper amount of pH balancing solution 230 can be pumped or dispensed from, for example but certainly not limited to, a standard one gallon bottle of muriatic acid into the pool through a fitting down a line 240 into the return plumbing line 110 as shown. A typical gallon of acid lasts approximately 30 to 60 days depending on chlorine demand and pool size. When the container with the pH balancing solution reaches a low level an alert can be sent and LED 270 can be lit to indicate the low level of solution remaining.

In an exemplary embodiment, it is also desirable, though not necessarily a requirement, for the pH monitoring and balancing unit 200 to "inject" or dispense this pH balancing solution 230, in this case muriatic acid, upstream of the smart salt chlorine generator cell 100 which will allow the acid to help "clean" the cell blades and extend their life. The pH monitoring and balancing unit 200 can also store the total amount of pH balancing solution 230 that has been dispensed by communicating with the dispensing device 230. In this way, the pH balancing monitoring and balancing unit 200 can indicate to the pool owner or maintenance staff when the pH balancing solution 230 is close to empty so they can service it. After additional pH balancing solution is added, the pH monitoring and balancing unit 200 can reset the measurement through programming in the controller 210 or manually through a button(s) 275 to allow the total to be reset to zero to allow the dispensing process to remain accurate.

In the exemplary embodiment shown, the dispense rate for the pH monitoring and balancing unit 200 is set by default based on an average 20,000 gallon pool. The pH monitoring and balancing unit 200 is equipped with an adjustment device 250 that allows the average dose to be lowered or raised depending on the size of the pool or the pH solution demand. The owner or maintenance staff monitors the pH after operation and either lowers or raises the dispense rate depending on the specific variables of the pool or body of water. The adjustment can be facilitated through adjustment device 250 that can include button(s) 275 and/or programmable interface screen 280. In addition to the adjustment of the amount of pH balancing solution 230 to be dispensed, a programmable interface screen or touch screen 280 through software on the pH balancing and monitoring unit controller 210 could also be programmed for the type of SmSCGC, pool size, amount of use, and other relevant variables. Alternatively or in conjunction with this input, existing sensor technologies or sensors in the SmSCGC can be used within the system to sense the pH and adjust automatically. This feature allows the user to compensate and customize their system for their pool requirements.

In addition to "polling" or communicating with the smart salt chlorine generator cell 100 and dispensing the proper amount of pH balancing solution 230, pH monitoring and balancing unit 200 can further communicate, for instance via the RS 485 or other wired or wireless protocol, to other controls or controllers (not shown) its operational parameters and additional information. For example, the total amount of acid dispensed can be communicated as well as the level of the remaining acid, performance parameters or other relevant information or variables pertaining to the pH monitoring and balancing unit 200, such as hours of operation, dispensing device status, and the like.

FIG. 2 provides a flow chart showing an exemplary method of operating an embodiment of the instant invention. The exemplary method of operating the system for controlling the pH balance of a body of water or pool within a given range can include the following steps as described herein below in detail. The method steps may be executed in any order and additional or fewer steps may be utilized without departing from the spirit of the invention. The pH system is powered on in a first step 1500. The amount of dispensed pH balancing solution is set to zero or adjusted to a preset or previously known number. The pH balancing system communicates with a SmSCGC controller in step 1510. The pH balancing system and the SmSCGC send and store information to each other. This information includes any existing SmSCGC generator time variable(s) and relevant performance and/or operating parameters.

When the SmSCGC is turned on to produce chlorine through electrolysis the "power on" time is continuously measured and the pH system calculates an estimate of the pH of the liquid, typically water in a pool in step 1520. Based on the calculation, the pH balancing system makes a decision to dispense or not to dispense in step 1530. If the negative branch is chose it loops back to the previous step and continues to measure the "power on" variables and calculate an estimated pH. Once the affirmative branch is chosen, based on the estimated pH and other suitable variables, a measured dose of pH balancing solution is dispensed into the body of water or pool at a known rate. An additional check on available pH balancing solution is made in step 1550. A decision is made to send an alert if there is a low level of solution, represented by the positive branch, which leads to an alert step 1560. If the solution level is sufficient, the negative branch leads to a dispensing step 1570, where a measured dose of pH balancing solution is dispensed and this amount is communicated back to the pH dispensing unit or system. The method can then loop the system back to the calculation step 1520 or a separate calculation of the adjusted pH can be made following dispensing (not shown) and the system loop through the dispensing steps 1510-1570 again. Thus the pH is again estimated after the addition of pH balancing solution and the system may continue through steps 1510-1570 to dispense additional pH balancing solution as needed until the estimates indicate that the pH is in a desired range, at which point the system can go back to simply monitoring the data from the smart salt chlorine generator cell.

Figure 3A:
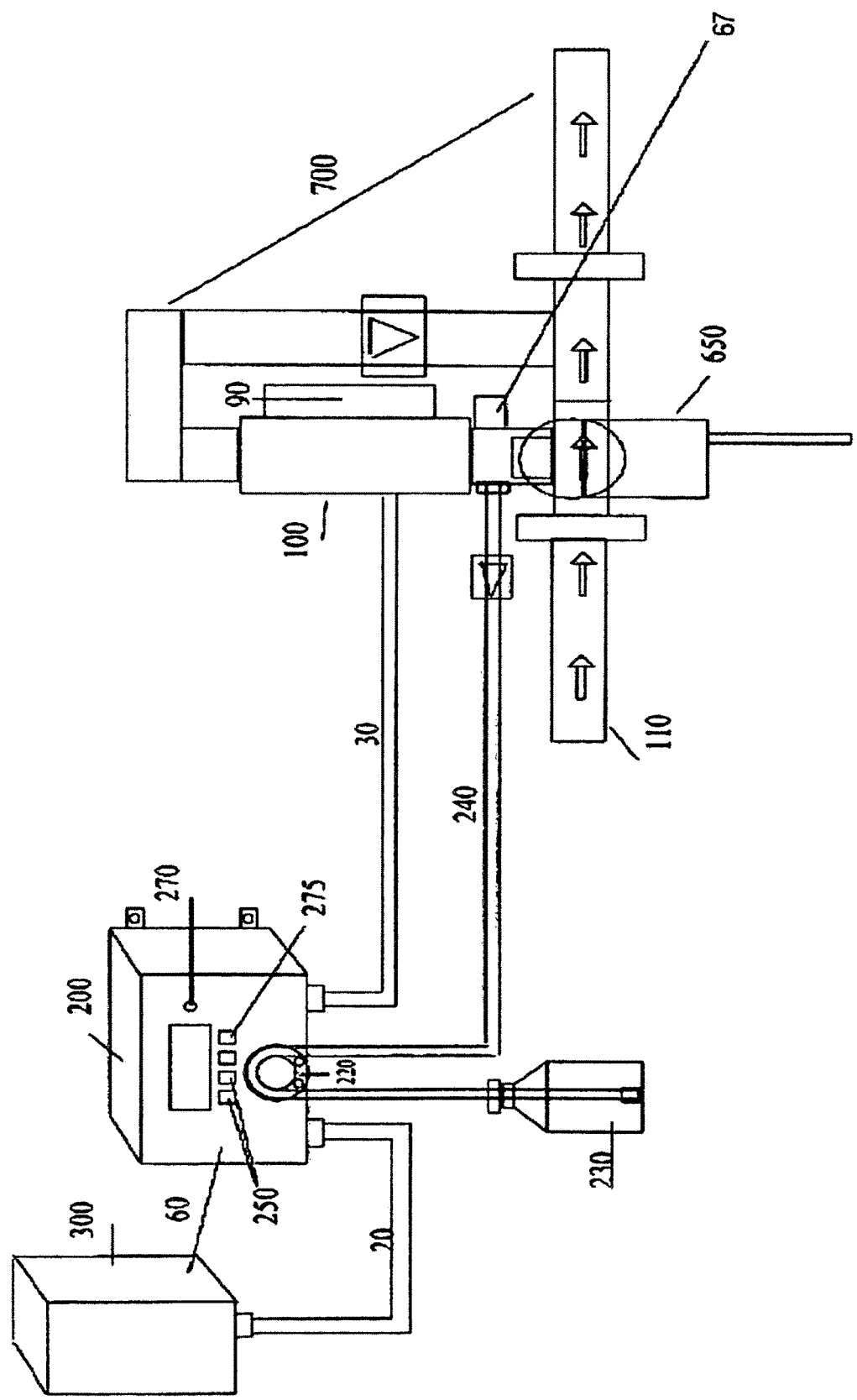
FIG. 3A shows a plan view of a further exemplary embodiment of the instant invention including a salt-chlorine generator cell blade cleaning feature in a closed operating position to allow for cleaning.
Figure 3B:
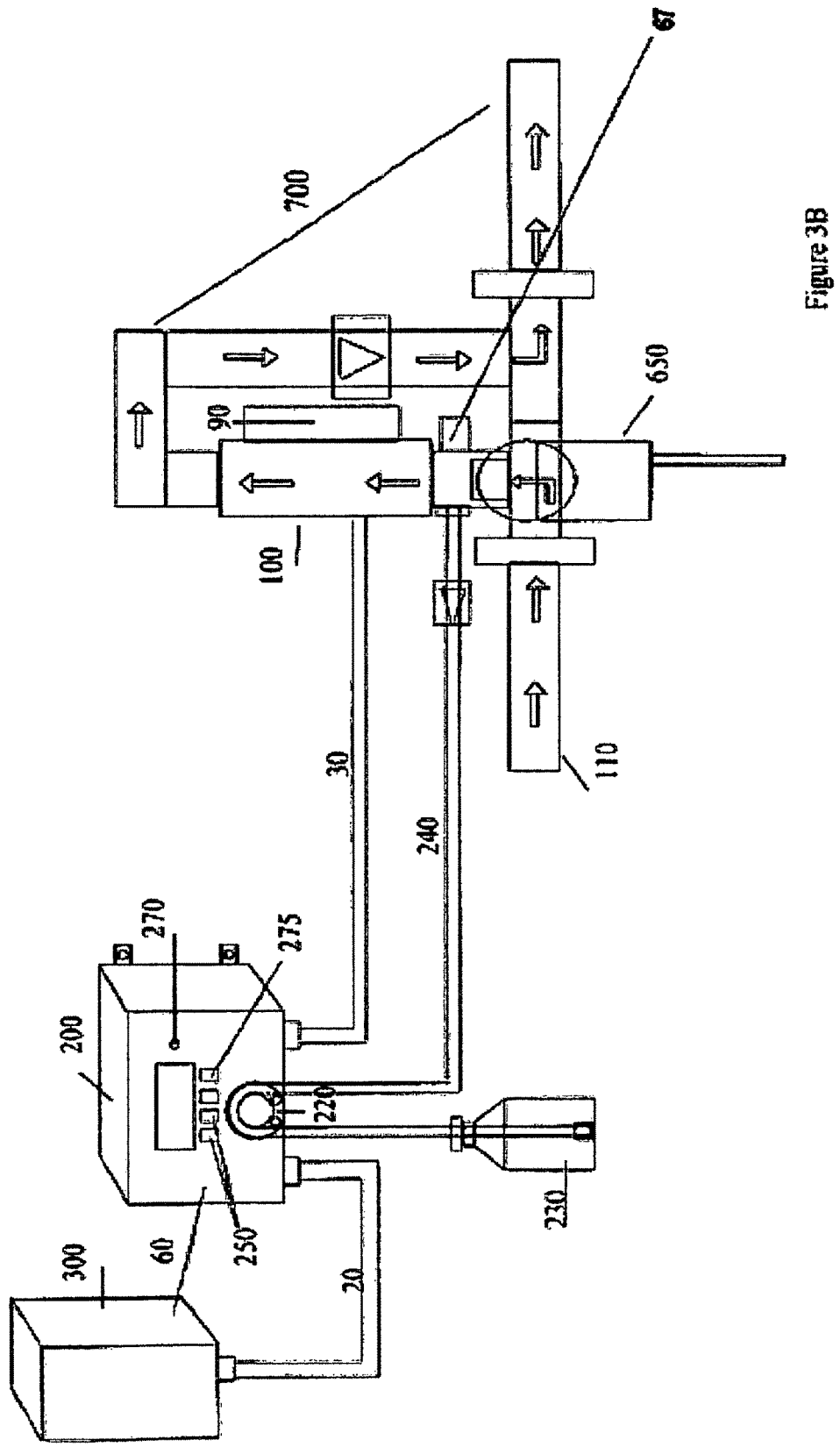
FIG. 3B shows a plan view of a further exemplary embodiment of the instant invention including a salt-chlorine generator cell blade cleaning feature in an open operating position where the chlorinator is operating to produce chlorine through electrolysis.

FIGS. 3A and 3B show a plan view of a further exemplary embodiment including a salt-chlorine generator cell blade cleaning feature in a closed and a normal operating position. In this further embodiment, the invention utilizes an actuated three-way valve 650 and separate piping loop 700 for chlorination of incoming water. The three-way actuated valve 650 normally diverts water into the loop having a smart salt chlorine generator cell 100 and then into the return plumbing line, as shown in FIG. 3B representing the "normal" operating mode passing water past the smart salt chlorine generator cell 100 and loop 700. In this case, the system monitors and dispenses chlorine in the incoming water and calculates an estimated pH based on the operation time of the smart salt chlorine generator cell 100, similar to the operation of the embodiment of FIG. 1. The smart salt chlorine generator cell controller 90 of the exemplary embodiment of FIGS. 3A and 3B is also monitoring the efficiency of the smart salt chlorine generator cell 100 and its electrolysis blades. The monitoring can be done directly or indirectly without departing from the spirit of the invention. A typical source for a decrease in efficiency in electrolytic salt chlorine generators is the build up of scale on the electrolysis blades.

FIG. 3A shows a plan view of a further exemplary embodiment including a salt-chlorine generator cell blade cleaning feature in a closed operating position to allow for cleaning. As such, a feature of the exemplary embodiment as shown in FIG. 3A is to use the addition of the pH balancing solution in the closed loop to chemically wash the blades with the typically acidic solution for a prolonged period of time and thereby clean them. Although the simple addition of the pH balancing solution upstream of the smart salt chlorine generator cell 100, as shown, assists in retarding the onset of scale buildup, the higher pH solution is not allowed to remain in contact with the blades to actually wash them. In the embodiment of FIGS. 3A and 3B, after a period of time or during regular periods of admission of the pH balancing solution 230 by the pH monitoring and balancing unit controller 210, the three-way valve 650 is shut to stop the flow of water within the chlorinator loop 700 as shown in FIG. 3A. No chlorination is being conducted at this time and, therefore, no electrolysis is occurring so no water flows into the loop 700. The principal flow is diverted straight through to the pool in the return line 110. The loop 700 remains "wet" with a specific volume of water trapped within it.

The signal to close the chlorinator loop 700 from the incoming water may also be issued from the smart salt chlorine generator cell controller 90 alone or in conjunction with a signal from the smart salt chlorine generator cell controller 90 to the pH monitoring and balancing unit controller 210 or alternatively be coordinated from an external master controller (not shown). The pH balancing solution 230 is measured as in the embodiment of FIG. 1 and then admitted from the pH solution dispensing device 220 as disclosed above in relation to FIG. 1. The pH balancing solution 230 can be, but is certainly not limited to, an acid solution like muriatic acid as noted above. The pH monitoring and balancing unit controller 210 can also wait and accumulate the demand for a specifically larger amount of acid required to reduce the pH for the pool that would also be sufficient to clean the blades of the smart salt chlorine generator cell 100. It would then only add the pH balancing solution 230 when enough of a demand has accumulated to properly clean the smart salt chlorine generator cell 100.

In either case, at this point, the pH monitoring and balancing unit controller 210 can activate the dispensing device 220 and add the pH balancing solution into the chlorinator loop 700. The added solution is allowed to diffuse into the water that remains in the chlorinator loop 700 and is in intimate contact with the smart salt chlorine generator cell 100 and its blades for a prolonged period of time. The blades are thereby chemically washed by the remaining water and pH balancing solution 230. After a set period of time the pH monitoring and balancing unit controller 210 or the smart salt chlorine generator cell controller 90 or a master controller (not shown) switches the actuated three way valve 700 into its "normal" chlorine generating mode as shown in FIG. 3B and returns to normal operation of the chlorinator as described herein below.

This cleaning maintains the smart salt chlorine generator cell 100 at peak performance, extends its life, and reduces its power consumption without requiring any user input and simultaneously continues to monitor and maintain the pH balance. It should be noted that the end opposite the inlet line in the chlorinator loop 700 can be open and effectively allow built up gasses and any pressure variations to equalize or vent. Alternatively, a check valve could be placed on the return side of the loop to assure a totally closed loop.

FIG. 3B shows a plan view of a further exemplary embodiment including a salt-chlorine generator cell blade cleaning feature in an open operating position where the chlorinator is operating to produce chlorine through electrolysis. In this mode the chlorine levels of the body of water are being increased by the smart chlorine generator 100 as directed by the smart chlorine generator controller 90. The chlorinator conducts electrolysis through its blades, producing chlorine but also producing scale on the electrolysis blades as described above. The pH balancing unit can continue to add solution as needed or wait to build up a need sufficient to chemically wash the blades as described above. In addition to having a mode allowing flow through the loop, a further position of the actuator valve 650 can be provided that allows maximum flow through the entire piping system by permitting water to jet through both the loop 700 and the portion of the return line 110 that is used to bypasses loop 700.

The command to open for maximum flow can be issued from the smart salt chlorine generator cell controller 90 alone or in conjunction with a signal from the smart salt chlorine generator cell controller 90 to the pH monitoring and balancing unit controller 210 or alternatively be coordinated from an external master controller (not shown). The three-way valve 650 is opened just enough to close the chlorine generator flow switch 67 and bypass the rest straight through the pipe to allow for maximum flow with the least restriction within the system. This allows for energy conservation, as the pump requires less pressure due to reduced resistance through the increased volume of pipe. This can, but is not necessarily limited to, periods of operation where chlorine is not being generated at the blades or where the flow within the return line is sufficiently high in pressure that redirecting the entire flow would not be ideal for chlorine generation. However, it should be noted, both the pH balancing unit and the chlorine generator can continue to operate in both the maximum flow and redirected modes.

Figure 4:
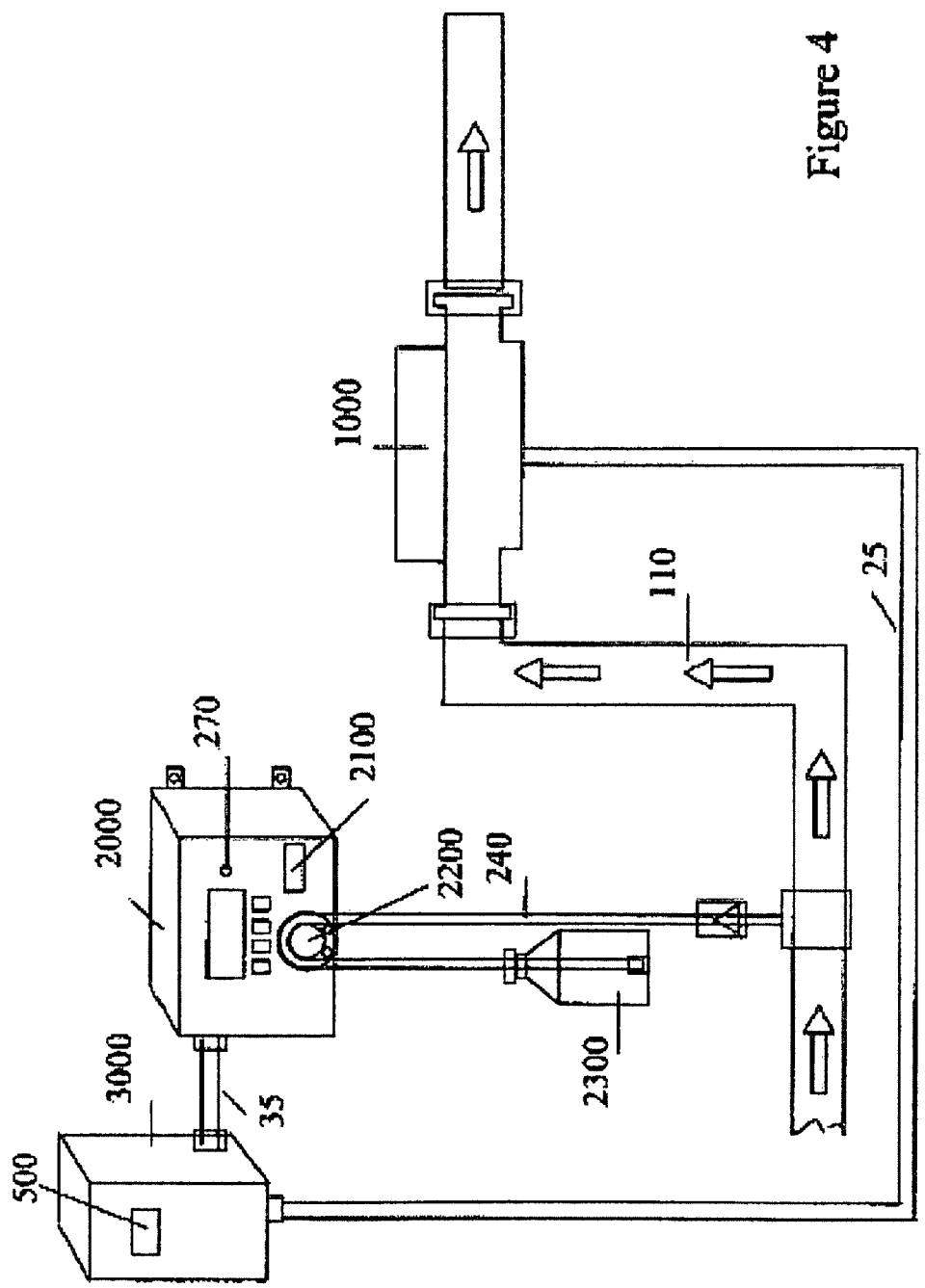
FIGS. 4 and 5 show plan views of further embodiments of the invention.
Figure 5:
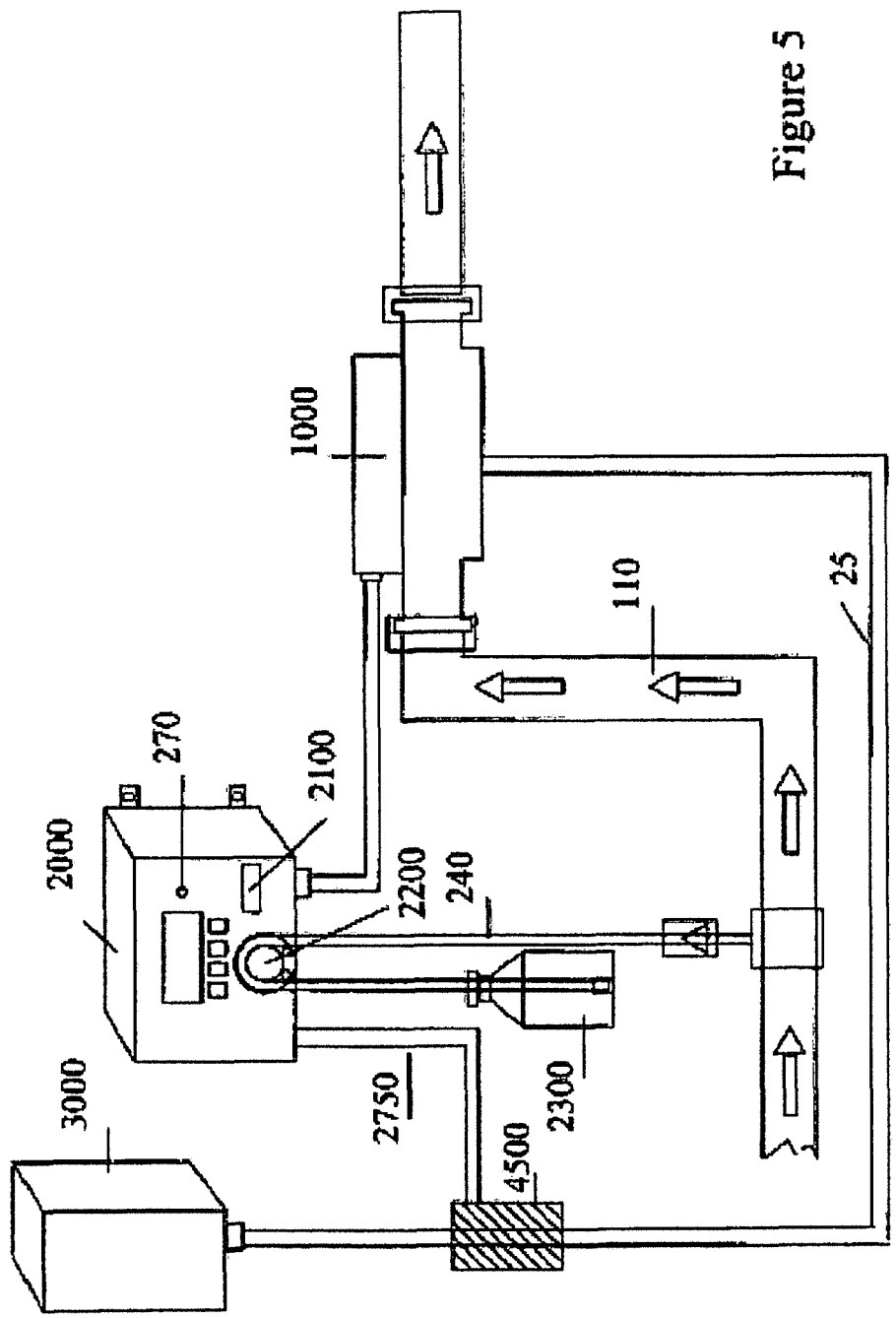

FIGS. 4 and 5 show plan views of further embodiment of the invention. These embodiments are for pools or spas that do not have the latest smart salt chlorine generator cells installed, but have an alternative salt chlorine generator cell (SCGC) system or another type of chlorine generator 1000. Essentially these embodiments provide a stand alone version of the pH monitoring and balancing unit 200 above with either a "smart" or programmable power supply controller 500, as in FIG. 4, or additional power monitoring elements 4500, as described below in relation to FIG. 5.

With respect to FIG. 4, in the embodiment shown, a "smart" or programmable power supply controller 500, capable of measuring and reporting power consumption and demand, provides power to the pH monitoring and balancing unit 2000 and the chlorine generator 1000 on the same circuit, allowing the power consumption of the chlorine generator 1000 to be measured by the smart power supply 500. The power supply 3000 is coupled to the pH monitoring and balancing unit 2000 via coupling 35 and to the chlorine generator via coupling 25.

With respect to FIG. 5, in instances where a "smart" power supply is not available, a power monitoring element 4500, such as an inductor coil or similar sensor capable of detecting a flow of energy into the chlorine generator 1000, can be provided and attached at a point where it can obtain the necessary data on the "on time" or time the salt chlorine generator 1000 as it receives power and is in operation. In this instance, the monitoring element is shown coupled to the coupling 25 connecting the power supply 3000 to the chlorine generator 1000. The power monitoring element 4500, here an inductive sensing device, senses the electrical load increase via the increase in inductance within the existing power supply wire or cord 25. This can then be used to calculate the operational time or "on time" of the chlorine generator 1000. The measured data from the monitoring element 4500 could then be communicated back via line 2750 to the pH monitoring and balancing unit 2000. This permits the pH monitoring and balancing unit 2000 to operate on any power supply and any chlorine generator 1000, so long as the power going to the chlorine generator 1000 has a known ratio for power to chlorine production output and this can be measured by the power monitoring element 4500.

In both FIGS. 4 and 5, the pH monitoring and balancing unit controller 2100 computes an estimated pH level based on the production of the chlorine generator 1000 as explained in relation to the embodiment of FIG. 1 and the variables discussed therein. The relative pH level of the water is determined mathematically by the amount of chlorination being done by the chlorine generator 1000 as a function of its operational time or "on time". The pH monitoring and balancing unit 2000, through its controller 2100 and the software contained thereon, can then compute the appropriate metering of the pH balancing solution 2300 based on this information and the dispensing mechanism 2200 can then dispense the solution in the needed amounts. The dispensing mechanism 2200 dispenses solution through line 240 into the return line 110. Finally, if no additional pH balancing solution 2300 is needed, the system goes back to monitoring the power going to the chlorine generator 1000.

The controller 2100 and its software can account for variations in make and model of chlorine generator 1000 and, as the system functions, can record and account for specific variations in the specific chlorine generator it is servicing. This data can be stored in memory devices within the controller or can otherwise be programmed into the pH monitoring and balancing unit 2000 at installation from an external data source. Additional variables used in calculating the output of the SCGC or other chlorine generator include water body volume, precipitation, water temperature, air temperature, sunlight hours, voltage, average power variance, and similar variables. With the input variables, the controller 2100 calculates the operational time or "on time" of the SCGC 1000. From this "on time" or operational time variable, the pH of the body of water or pool or pool is estimated and an adjustment requirement is determined and this in turn determines the set amounts of pH balancing solution to be dispensed by the dispensing mechanism 2300.

Figure 6:
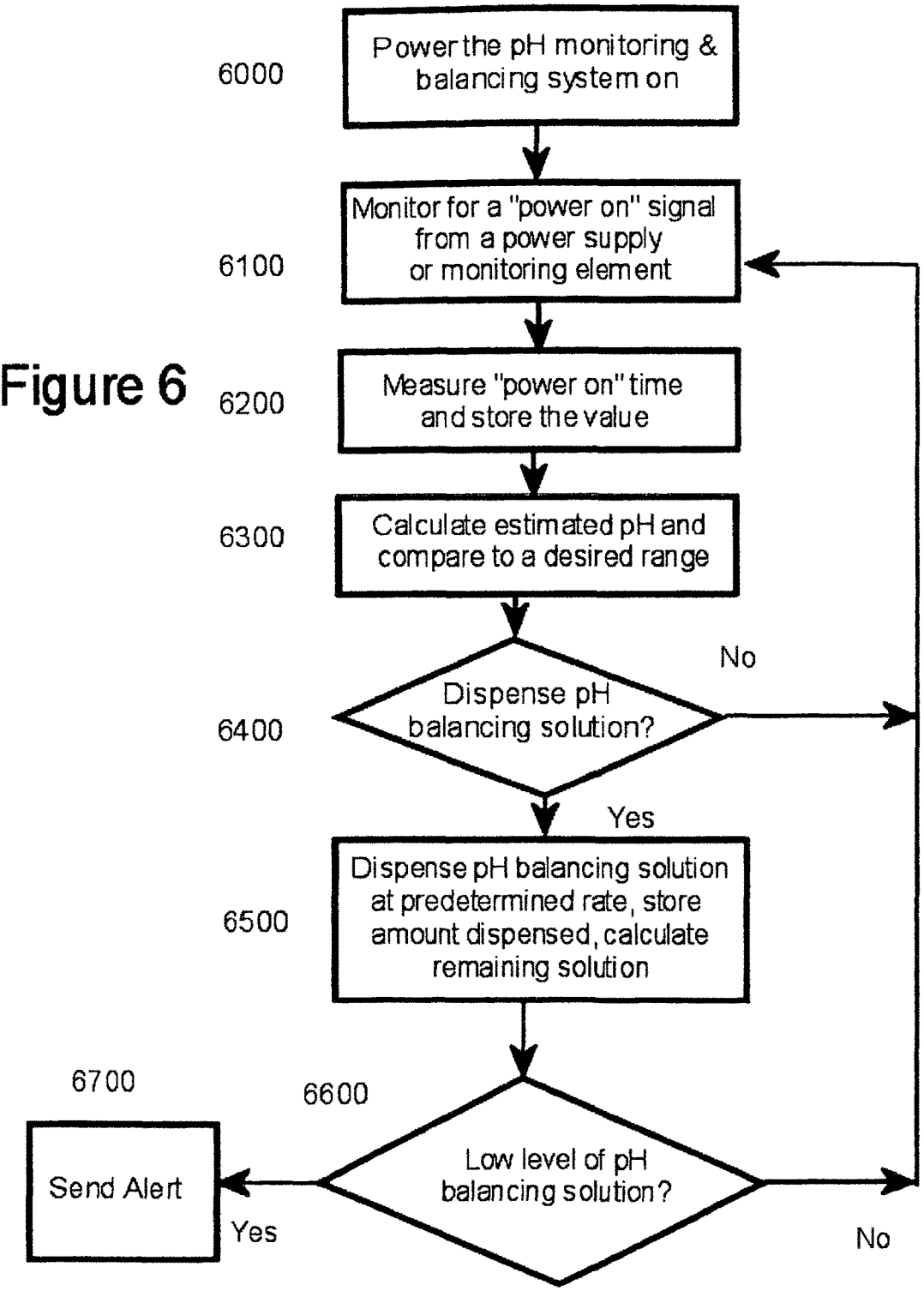
FIG. 6 is a flow chart describing an exemplary method of operating an embodiment of the instant invention

FIG. 6 is a flow chart describing an exemplary method of operating an embodiment of the instant invention. A "smart" or programmable power supply controller 500 is coupled to a chlorine generator 1000 and a pH balancing and monitoring unit 2000 or a monitoring element 4500 is provided to report power consumption of a chlorine generator 1000 to a pH balancing and monitoring unit 2000 such that the power consumption of the salt chlorine generator 1000 can be monitored in either case. The flow chart for the exemplary method of operating the embodiment begins with powering on a pH monitoring and balancing unit 2000 in step 6000. The amount of dispensed pH balancing solution is set to zero or a previously determined starting level. Power is provided to the chlorine generator 1000 when demanded and monitored by the pH monitoring and balancing unit 2000 in step 6100. The pH monitoring and balancing unit 2000 monitors for a "power on" signal from programmable power supply controller 500 or power monitoring element 4500 indicating that power is being provided to the chlorine generator 1000 and it is operating. The pH monitoring and balancing unit 2000 receives the "power on" signal and stores the total "on time" in step 6200. It then calculates an estimated level of chlorine production based on the "on time" in step 6300.

Based on these calculations an estimated pH based on the "on time" or operational time of the chlorine generator 1000 is made. If the pH is within a set range, the method of operation returns to the monitoring step 6100. If the pH is not within the set range, the pH monitoring and balancing unit 2000 is operated to dispense pH balancing solution 2300 at predetermined rate in step 6400. Once the calculated amount of pH balancing solution has been added to the water, the amount used is stored as a variable within the pH monitoring and balancing unit 2000 in step 6500. A decision step 6600 determines if the calculated remaining solution is nearing a preset "low" level. A further step in the method notifies a user, maintenance or owner to the lack of the low level of pH balancing solution if the calculation determines the amount is nearing the preset low level in step 6700. Otherwise, the method loops back to the monitoring step.

The embodiments and examples discussed herein are non-limiting examples. The invention is described in detail with respect to exemplary embodiments, and it will now be apparent from the foregoing to those skilled in the art that changes and modifications may be made without departing from the invention in its broader aspects, and the invention, therefore, as defined in the claims is intended to cover all such changes and modifications as fall within the true spirit of the invention.

We claim:

1. A chemical balancing system for a pool, comprising:
   a salt chlorine generator system producing chlorine through an electrolytic process at a salt chlorine generator cell in communication with a flow of water from the pool;
   a pH monitoring and balancing unit coupled to the salt chlorine generator system; and
   a controller in communication with both the salt chlorine generator system and the pH monitoring and balancing unit, the controller configured to:
   estimate a current pH value of the pool by obtaining a time period the salt chlorine generator system is in an operational state,
   determine how much pH balancing solution is required to re-balance the pool to a desired pH level, and
   dispense pH balancing solution until the pH level in the pool reaches the desired pH level.

2. The chemical balancing system for a pool of claim 1, wherein the controller monitors the power drawn by the salt chlorine generator system and measures the time period the salt chlorine generator system is in the operational state.

3. The chemical balancing system for a pool of claim 1 further comprising a dispensing mechanism, the dispensing mechanism dispensing the pH balancing solution into the pool.

4. The chemical balancing system for a pool of claim 3, wherein the dispensing mechanism is located upstream of the salt chlorine generator cell.

5. The chemical balancing system for a pool of claim 3, wherein the dispensing mechanism is at least one of a dispensing pump, a peristaltic pump, a venturi feed system, a diaphragm pump, or a gravity feed tube.

6. The chemical balancing system for a pool of claim 1, wherein a dispense rate for the pH monitoring and balancing unit is set by default based on an average 20,000 gallon pool.

7. The chemical balancing system for a pool of claim 1, wherein the controller includes a programmable interface screen that allows adjustment of one or more of an amount of pH balancing solution to be dispensed, a type of salt chlorine generator cell, a pool size, or an amount of use.

8. The chemical balancing system for a pool of claim 1, wherein the controller calculates an estimate of a pH value of water in the pool when the controller is powered on.

9. The chemical balancing system for a pool of claim 1, wherein the pH balancing solution is used in a closed loop to chemically wash blades of the salt chlorine generator cell.

10. The chemical balancing system for a pool of claim 1, wherein the controller at least one of dispenses pH balancing solution immediately upon need and accumulates demand for an amount of pH balancing solution required to reduce the pH for the pool and clean the smart salt chlorine generator cell.

11. A chemical balancing system for a body of water, comprising:
a salt chlorine generator;
a power supply coupled to the salt chlorine generator;
a pH monitoring and balancing unit configured to
calculate an operational time for the salt chlorine generator, and
determine an estimated pH level of the body of water based on the operational time of the salt chlorine generator; and
a power monitoring element that detects power consumption by the salt chlorine generator and reports to the pH monitoring and balancing unit the power consumption by the salt chlorine generator.

12. A chemical balancing system for a body of water of claim 11, wherein the pH monitoring and balancing unit is configured to dispense a discrete amount of pH balancing solution based on the estimated pH level to return the pH of the body of water to within a desired range.

13. A chemical balancing system for a body of water of claim 11, wherein the power monitoring element is an inductor coil coupled to a power cord that connects the power supply to the salt chlorine generator.

14. A chemical balancing system for a body of water of claim 11, wherein software in the pH balancing and monitoring unit is programmed through a programmable interface screen to adjust a dispensing rate for at least one of a type of salt chlorine generator, a volume of the body of water, and an amount of use the body of water receives.

15. A chemical balancing system for a body of water of claim 11, wherein the pH monitoring and balancing unit includes a cleaning feature that accumulates a demand for an amount of acid required to reduce the pH for the pool and clean the salt chlorine generator.

16. A chemical balancing system for a body of water of claim 11, wherein the pH monitoring and balancing unit includes a quick disconnect power plug.

17. A chemical balancing system for a body of water of claim 11, wherein the pH monitoring and balancing unit includes a dispensing pump.

18. A chemical balancing system for a body of water of claim 17, wherein the dispensing pump is located externally to the pH monitoring and balancing unit.

19. A chemical balancing system for a body of water of claim 11, and further comprising a controller that measures hours of operation of the salt chlorine generator and computes the estimated pH value of the body of water.

20. A chemical balancing system for a body of water of claim 19, wherein the controller determines how much pH balancing solution is required to re-balance the body of water to a desired pH range through one of lookup tables or through a mathematical representation of a change in pH created by the electrolysis process per minute and calculates the change for the operational time of the salt chlorine generator.

* * * * *